United States Patent [19]

Hohn

[11] 4,416,336

[45] Nov. 22, 1983

[54] TOOL BAR CARRIER WITH CASTERING WHEELS

[76] Inventor: Marlin W. Hohn, Rte. 1, Box 2C, Parkston, S. Dak. 57366

[21] Appl. No.: 338,988

[22] Filed: Jan. 12, 1982

[51] Int. Cl.³ .......................... A01B 63/32; B60D 1/00
[52] U.S. Cl. ..................................... 172/386; 172/478; 172/502; 280/411 A; 280/474; 280/476 R
[58] Field of Search .............. 280/411 A, 411 R, 412, 280/474, 476 R, 476 A; 172/478, 482, 491, 502, 172/383, 386, 311, 517

[56] References Cited

U.S. PATENT DOCUMENTS

| | | | |
|---|---|---|---|
| 3,021,621 | 2/1962 | Needham | 172/502 |
| 3,033,593 | 5/1962 | Zaha | 280/474 |
| 3,169,027 | 2/1965 | Oerman | 280/411 A |
| 3,613,801 | 10/1971 | Roth | 172/482 |
| 3,954,144 | 5/1976 | Blair | 280/411 A |

Primary Examiner—Joseph F. Peters, Jr.
Assistant Examiner—Donn McGiehan

[57] ABSTRACT

A tool bar carrier for farming implements adapted to raise the tools carried by it and mounted on fully swiveling wheels. The bar is coupled flexibly and releasably to the pulling device, and the coupled wheels are capable of being locked in a straight forward position if desired.

2 Claims, 5 Drawing Figures

TOOL BAR CARRIER WITH CASTERING WHEELS

BACKGROUND AND SUMMARY OF THE INVENTION

This invention pertains to tool bars of a type commonly used in agriculture to carry fertilizer injectors, mulching devices and the like. This type of device is commonly used behind some other implement such as a disc harrow, tandem disc or other implement.

When the ordinary tool bar is individually carried on its own wheels behind another implement, as most are, the turning radius of the whole device becomes inordinately large, creating problems in turning and covering a strip of ground adjacent to the just completed strip. Also, in certain close areas such as may be encountered on contour farmed areas, it may be desirable to move the entire assembly in a reverse direction. By my invention I make such operation possible. I do this by providing fully castering wheels and a hitching means which may be either close coupled and relatively rigid, or released to freely follow the pulling device.

FIGURES

DESCRIPTION

Figure 1:
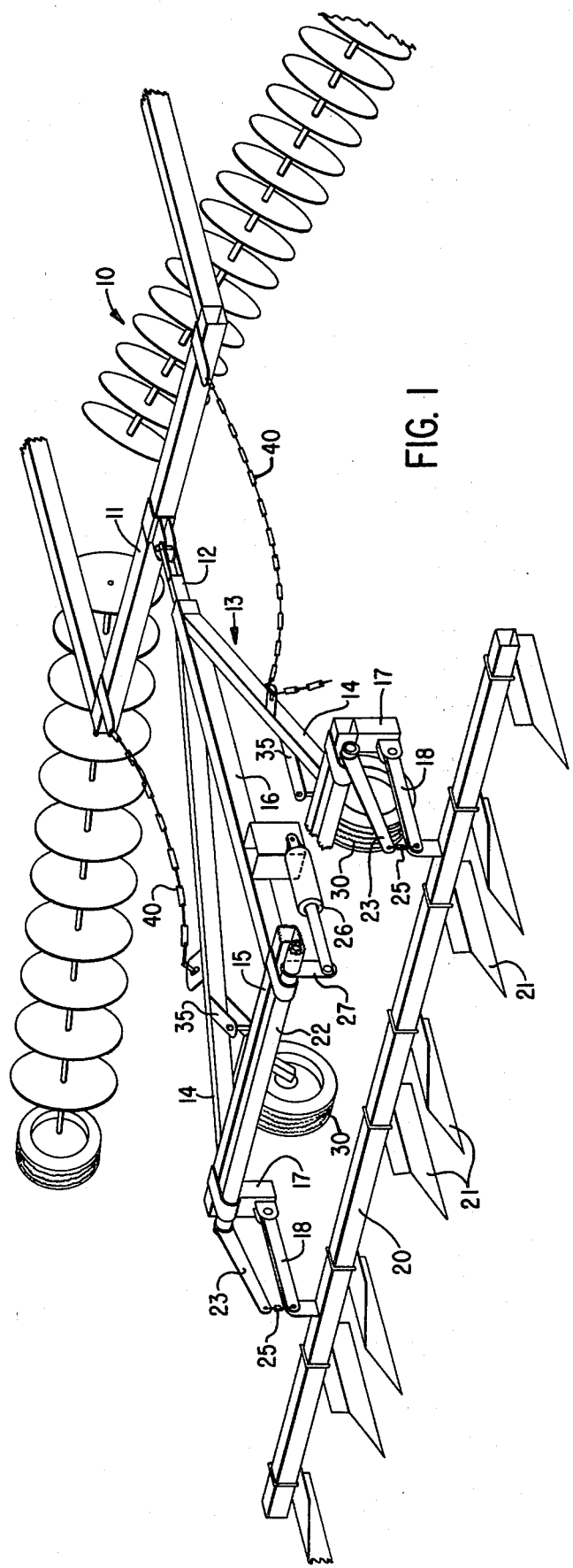
FIG. 1 is a pictorial view of my device coupled to a disc harrow.
Figure 2:
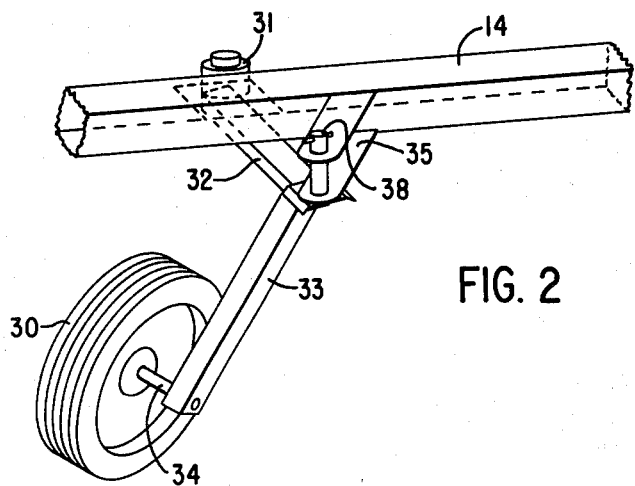
FIG. 2 is a detailed view to an enlarged scale of one of the wheels of my device with its mounting.
Figure 3:
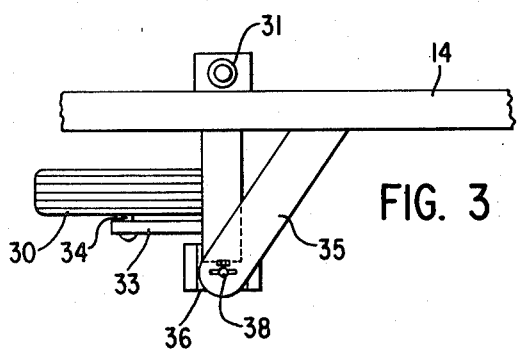
FIG. 3 is a top plan view of the mounting of the wheel as shown in FIG. 2.
Figure 4:
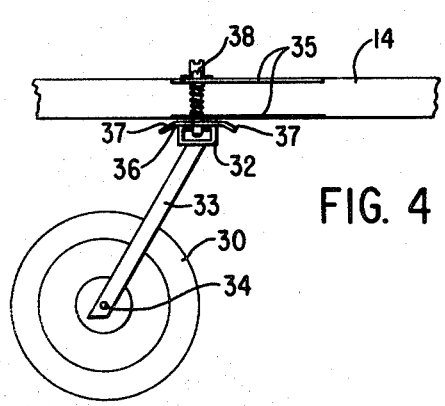
FIG. 4 is a side elevational view of the wheel mounting as shown in FIG. 3.
Figure 5:
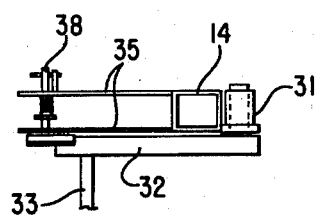
FIG. 5 is a front elevational of the wheel mounting of FIG. 3.

Briefly my invention comprises a lifting tool bar mounted on castering wheels and adapted to be tightly coupled behind another implement which, in turn, is pulled by a farm tractor. The wheels can be locked in a fixed position or released to caster thus allowing considerable flexibility in pulling the implement.

More specifically and referring to the figures, I illustrate my device as being pulled behind a disc 10 having a frame 11. My device is connected to the frame 11 of the disc by a tongue 12 pivotally coupled to the frame 11 in the customary manner. The disc is pulled in the usual way by a tractor not shown.

The tongue 12 is part of a frame 13 which supports the implement. That frame includes side bars 14 and a rear member 15 forming a triangular shape and a center member 16 which is an extension of the tongue 12.

The rear member 15 has downwardly projecting legs 17 at each end. Support links 18 are pivotally connected to these legs 17 and extend rearwardly. At the rearward end, these links 18 carry the tool bar 20 on which are supported the tools 21 specifically adapted for whichever operation the bar is to be used for. A lifting bar 22 is pivotally journalled to the rear member and lies parallel to that member. At its outward ends, lifting links 23 are fixed to the bar 22 and will be operated by the bar. The lifting links 23 are preferably placed directly above the support links 18. The lifting links 23 can then be flexibly connected to the support links 18 by a chain 25 or the like. If the links were offset from each other, then the connection from the lifting links would have to be made with some other part of the bar 20.

In order to provide for controlled lifting of the tool bar 20 through the linkage just described, a power control is provided. I prefer a hydraulic piston-cylinder arrangement 26 connected between the center member 16 of the frame and an arm 27 fixed to the bar 22. Thus, extension of the hydraulic mechanism pushes the arm 27 and tends to rotate the bar 22. In the mechanism shown, such rotation would be in a direction to lift the tool bar 20, but if the direction of extension of the arm were reversed, a retraction of the hydraulic mechanism could be used through similar means to raise the tool bar.

In order to provide for ease in making shorter turns at the ends of crop rows and the like, I provide a novel arrangement for attaching my device to another pulled device such as the disc 10. The carrying wheels 30 are mounted to the frame 13 so that they will caster. Specifically and as is best shown in FIGS. 2-5, I provide a bracket 31 on the side bar 14 on which is pivotally mounted a wheel carrier having a horizontal member 32 pivoted to the bracket 31 and a vertical member 33. The axle 34 of the wheel 30 is fixed to the vertical member 33 and is located so that the wheel is slightly offset from the pivot on the bracket 31. The member 33 also is swept back from its juncture with the horizontal member 32 toward the rear of the frame so that the wheel trails behind the pivot axis. This formation provides a castering mechanism so that the wheels 30 adjust to the line of travel of the frame 13 to which they are attached.

In order to provide for direct tracking of the device, I also provide for locking the castering device. A pin bracket 35 extends from the side bar 14 over each wheel carrier near the end of each horizontal member 32 when the wheels are substantially aligned with the center member 16. A plate 36 on the horizontal member 32 of the wheel carrier has its ends bent downward at 37 (FIG. 4) so that it will guide the wheel carrier under the bracket 35. A pin 38 is mounted on the bracket 35 and may be spring loaded in a downward direction. This pin projects through the bracket 35 and through a hole formed in the horizontal member 32 of the wheel carrier. The engagement of this pin 38 with the bracket 35 and the member 32 then pins the wheel carrier in place so that the wheel tracks in a straight forward direction. When the pin is released the wheels are free to caster.

In order to provide for the shortest turning radius, I couple the frame 13 of my device to the frame 11 of the pulling device. As shown in FIG. 1, I prefer to use chains 40 because the length can be readily adjusted. However, any flexible coupling device could be used. By coupling the two devices closely and allowing almost no flexibility, the tool bar on its castering wheels could be turned very sharply, and might even swing in a direction such that the wheels would be turned at right angles to normal travel. In that mode, the device can also be driven in reverse, because the pulling disc 10 (or other implement) can be backed like a two-wheeled trailer, and the castering wheels 30 would allow the tool bar carrier and the disc to act as a unit when tightly coupled.

In use in a field where the tool bar carrier is supposed to travel in a straight line, the coupling chains 40 can be relaxed or released and the wheels pinned, and then the bar carrier will operate in the same manner as previously known carriers.

I claim:

1. A tool bar carrier including a frame having a tongue at the front thereof adapted to be connected to a pulling device, tool bar means movably mounted on said frame opposite said tongue, means connected between said frame and said tool bar means by which said tool bar means can be lifted relative to said frame, wheel carrier means pivotally mounted on said frame and including axles, the axis of said axles being in a location to the rear of said pivotal mounting, wheels journalled on said axles and adapted to castor around said pivotal mounting, and flexible connecting means connected between said frame and said pulling device adapted to be adjustably shortened so that the position of said frame relative to said pulling device is flexible within limits prescribed by the length of said flexible means.

2. The device of claim 1 in which pin means is engageable between said carrier means and said frame to prevent the pivotal movement of said carrier means.

* * * * *